United States Patent
Takano et al.

(10) Patent No.: US 6,861,272 B2
(45) Date of Patent: Mar. 1, 2005

(54) OPTICAL DEVICE FREE FROM STRESS DUE TO DIFFERENCE IN THERMAL EXPANSION COEFFICIENT BETWEEN PARTS AND PROCESS FOR FABRICATION THEREOF

(75) Inventors: Yasuaki Takano, Shizuoka (JP); Naoshi Horiai, Shizuoka (JP)

(73) Assignees: Yamaha Corporation, Shizuoka-Ken (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/417,147

(22) Filed: Apr. 17, 2003

(65) Prior Publication Data

US 2003/0207481 A1 Nov. 6, 2003

Related U.S. Application Data

(62) Division of application No. 10/211,266, filed on Aug. 5, 2002.

(30) Foreign Application Priority Data

Aug. 6, 2001 (JP) ........................................ 2001-237796

(51) Int. Cl.[7] .............................................. H01L 21/00
(52) U.S. Cl. ............................ 438/26; 438/25; 438/27; 438/29

(58) Field of Search ............................... 438/26, 25, 27, 438/29, 121, 800, 65, 69

(56) References Cited

U.S. PATENT DOCUMENTS

| 4,875,617 A | * 10/1989 | Citowsky .................. 228/123.1 |
| 5,999,325 A | * 12/1999 | Eda et al. .................... 359/619 |

FOREIGN PATENT DOCUMENTS

JP    03146914 A  *  6/1991  ............ G02B/7/02

* cited by examiner

*Primary Examiner*—Amir Zarabian
*Assistant Examiner*—Christy Novacek
(74) *Attorney, Agent, or Firm*—Dickstein, Shapiro, Morin & Oshinsky, LLP.

(57) ABSTRACT

An optical device is broken down into an optical element made of optical crystal and a holder made of alloy approximated in thermal expansion coefficient to the optical crystal, and the optical element is soldered to or melt bonded to the holder with a piece of solder or glass; the joint area is spaced from the periphery of the optical crystal so that a buffer area, which is spaced from the periphery, is created between the periphery and the joint area; even if cracks and/or scratches have been occurred in an end surface of the optical element, thermal stress is less influential in growing the scratches by virtue of the buffer area, and the optical device.

8 Claims, 3 Drawing Sheets

OPTICAL DEVICE FREE FROM STRESS DUE TO DIFFERENCE IN THERMAL EXPANSION COEFFICIENT BETWEEN PARTS AND PROCESS FOR FABRICATION THEREOF

CROSS REFERENCE TO RELATED APPLICATION

This application is a divisional of U.S. application Ser. No. 10/211,266 filed Aug. 05, 2002.

FIELD OF THE INVENTION

This invention relates to an optical device and, more particularly, to an optical device comprised of an optical element and a metallic holder and a process for fabricating the optical device.

DESCRIPTION OF THE RELATED ART

Various optical devices are employed in optical systems. Filter and wave plates are typical examples of the optical devices. Pieces of optical crystal such as optical glass, alumina, titanium oxide and garnet are essential parts of the optical devices, and are usually supported by metallic holders. Low temperature solder, high temperature solder or low melting point glass are available for the optical devices. The pieces of optical crystal are soldered or melt bonded to the metallic holders with a piece of solder or a piece of low melting point glass. It is preferable that the metallic holders are made of alloy, which are small in coefficient of thermal expansion. Conventionally, the metallic holders are made of iron-nickel-cobalt alloy and several sorts of stainless steel. The iron-nickel-cobalt alloy is called by its trade name "Kovar", and the stainless steel is, by way of example, SUS304, SUS316 and SUS450.

Although the manufacturer makes the metallic holders of the alloy small in thermal expansion coefficient, there still remains the difference in thermal expansion coefficient between the pieces of optical crystal and the metallic holders, and the thermal stress is exerted on the optical devices. The thermal stress is causative of difference between the design optical characteristics and actual optical characteristics. The optical elements were broken at their worst.

A combination of a piece of optical crystal and a metallic holder is disclosed in Japanese Patent Application laid-open No. 12-106407. The prior art optical device includes a base plate, a frame fixed to the periphery of the base plate for defining an inner space and a cover plate fixed to the frame for closing the inner space. A semiconductor optical element is mounted on the base plate, and is directed to a hole formed in the frame. A metallic tubular holder is inserted into the hole, and fixed to the frame. An optical fiber is fixed into the metallic tubular holder, and the metallic tubular holder keeps an optical fiber opposed to the semiconductor optical element. An optical element is fixed to an inner end of the metallic tubular holder, and is transparent to the light between the semiconductor optical element and the optical fiber.

In the prior art optical device, the optical crystal for the optical element and the alloy for the metallic holder are selected in such a manner that the difference in thermal expansion coefficient is as small as possible. The optical element is made of boro-silicate glass, and the metallic tubular holder is made of iron-nickel alloy. Although the optical element is brazed to the metallic tubular holder, the thermal stress is so small that the optical element properly transmits the light between the semiconductor optical element and the optical fiber.

The present inventors fabricated samples of the prior art optical device disclosed in the Japanese Patent Application laid-open, and investigated the optical properties of the optical element. The present inventors found that strain was still serious in several samples. The optical elements of some samples did not exhibit the design optical characteristics, and the optical element of another sample was cracked. Thus, the problem was not perfectly solved in the prior art optical device disclosed in the Japanese Patent Application laid-open.

SUMMARY OF THE INVENTION

It is therefore an important object of the present invention to provide an optical device, which is free from the thermal stress unavoidably exerted thereon due to difference in thermal expansion coefficient between parts thereof.

It is also an important object of the present invention to provide a process for fabricating the optical device.

The inventors investigated the samples, and found that miniature crackets or scratches had already introduced at end surfaces of several optical elements before the assembling. It was considered that the cracks or scratches had occurred during separation of a bulk into pieces of optical crystal. The present inventors further noticed the optical crystal anisotropically expanding under application of heat. This meant that the thermal expansion differed depending upon crystal axis direction. The anisotropy in thermal expansion resulted in unexpected thermal stress. The present inventors presumed that the cracks or scratches were grown due to the unexpected thermal stress in the assembling with the metallic holder. The present inventors concluded that the unexpected thermal stress was not to be exerted on the end surfaces, where the scratches had unavoidably occurred.

To accomplish the object, the present invention proposes to create a buffer zone between the periphery of an optical element and a joint surface between the optical element and a holder different in thermal expansion coefficient from the optical element.

In accordance with one aspect of the present invention, there is provided an optical device exhibiting optical characteristics comprising an optical element including an optical body made of optical material and having major surfaces and at least one end surface extending between peripheries of the major surfaces, at least one of the major surfaces having a joint area spaced from the periphery thereof and a buffer area located between the joint area and the periphery, and a holder made of certain material different in thermal expansion coefficient from the optical substance and having a joint area fixed to the joint area of the optical element and spaced from the buffer area.

In accordance with another aspect of the present invention, there is provided a process for fabricating an optical device comprising the steps of a) preparing an optical element having major surfaces and at least one end surface extending between peripheries of the major surfaces, a holder having a surface and a piece of fusible material, b) determining a joint area spaced from the periphery of at least one of the major surfaces and another joint area on the surface of the holder, c) aligning the joint area with the another joint area, and d) bonding the joint area to the another joint area by means of the piece of fusible material.

BRIEF DESCRIPTION OF THE DRAWINGS

The features and advantages of the optical device and process for fabrication thereof will be more clearly understood from the following description taken in conjunction with the accompanying drawings, in which.

DESCRIPTION OF THE PREFERRED EMBODIMENT

Optical Device

Figure 1:
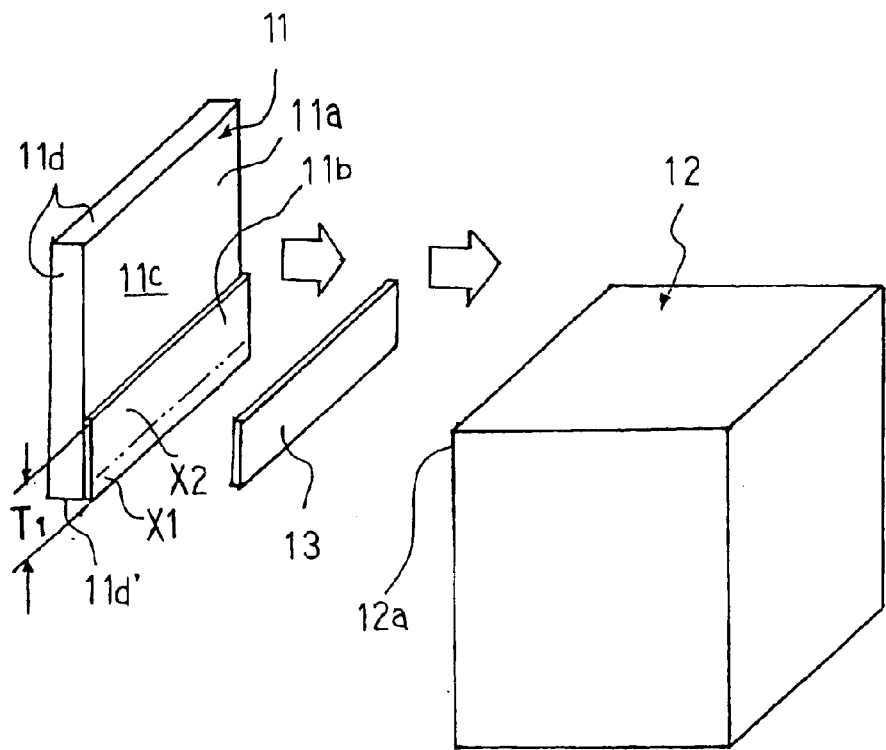
FIG. 1 is a schematic perspective view showing an optical device disassembled into parts.

The optical device embodying the present invention comprises an optical element and a holder. The optical element is implemented by an optical body made of an optical material. The optical body serves as an optical lens or an optical filter, by way of example. In case where the optical body is the optical lens or optical filter, the optical body is made of optical crystal so as to achieve the given task on incident light. The optical crystal may be optical glass, alumina ($Al_2O_3$) or rutile ($TiO_2$).

The optical element may have a composite body. A composite body includes the optical body and a metallization layer. The metallization layer is to be strongly bonded to the optical crystal, and is expected to be affinitive to solder. In other words, solder is to be well bonded to the metallization layer. In case where the metallization layer is made of substance less affinitive to either optical crystal or solder, a multi-layered metallization may be applied to the optical element. When material for the metallization layer, the thickness of the metallization layer and film forming techniques are designed, the margins of the optical characteristics are taken into account.

On the other hand, the holder is made of alloy approximated in thermal expansion coefficient to the optical material. Such a preferable alloy may have a main component of iron-nickel (Fe—Ni) alloy or iron-nickel-cobalt (Fe—Ni—Co) alloy. Stainless steel is available for the holder. An example of iron-nickel-cobalt alloy is Kovar (trade name), which is composed of 54% of Fe, 29% of Ni and 17% of cobalt. In the iron-nickel alloy series, "42 alloy", which is a trade name, is composed of 58% of Fe and 42% of Ni. Examples of stainless steel are SUS304, SUS316 and SUS 450.

These sorts of alloy are resistive against corrosion. However, in case where the optical device is exposed to corrosive environment, the alloy may be plated with corrosion-resistive material such as nickel. The entiree surface of the holder may be perfectly plated with the corrosion-resistive material, or only the joint area may be plated with the corrosion-resistive material. A multi-layered corrosion-resistive material structure may be plated on the holder. In this instance, it is preferable that the outermost layer is made of corrosion-resistive material, which also has large bonding strength. If the holder is made of substance less affinitive to solder, the joint area may be plated with a metal or alloy layer made of substance affinitive to the solder.

The optical element is bonded to the holder by means of solder or glass. The glass has a low melting point. The low melting point glass is affinitive to both of the optical crystal and holder of iron-nickel ally, iron-nickel-cobalt alloy or stainless steel. For this reason, neither metallization layer nor plating layer may be required for the optical element and holder. In case where the optical element is bonded to the holder by means of a piece of solder, the solder is expected to strongly bond the optical element to the holder. It is preferable to select the solder from the group consisting of Au—Sn alloy, Au—Ag—Cu alloy, Sn—Ag—Cu alloy and Sn—Ag alloy.

The optical element has a certain contour adapted to an optical system. The optical element may have a plate-like shape. In any contour, the optical element has a pair of major surfaces, and the major surfaces have respective peripheries. The major surfaces may be square, rectangle or circle. In case where the optical element serves as a lens or filter, light is incident on one of the major surfaces, and is output from the other major surface. End surfaces extends between the peripheries of the major surfaces. The optical crystal was cut from a bulk of optical crystal, and the cutting plane was at least one end surface of the optical element. The end surfaces are connected to the major surfaces along the peripheries. Cracks or scratches unavoidably are generated in the cutting plane or the end surface.

The major surface has a joint area spaced from the periphery. The optical element is bonded at the joint area to the holder by means of the piece of solder or piece of glass. The major surface further has a buffer area between the joint area and the periphery so that the optical element is spaced from the holder at the buffer area. In other words, the buffer area is not bonded to the holder.

The buffer area is effective against the thermal stress and growth of cracks. Although the optical element and holder are made of the above-described sorts of material approximated in thermal expansion coefficient to one another, it is difficult to perfectly eliminate the difference in thermal expansion coefficient between those sorts of material. Moreover, the anisotropy makes the adjustment complicated. For this reason, there remains a small amount of thermal stress exerted on the optical element. Nevertheless, the thermal stress is less influential in growing the cracks. This is because of the fact that buffer zone, the surface of which is the buffer area, absorbs the thermal stress.

The present inventors investigated the stress absorbing capability of the buffer zone. The present inventors concluded that the buffer zone required at least 20 micrometers between the cutting plane and the joint area. In, other words, it is preferable to space the joint area from the periphery of the major surface by at least 20 micrometers. However, if the optical element is not expected to exhibit a high performance, the manufacturer may decrease the minimum space. Thus, the minimum value of the buffer area is merely applied to standard optical elements.

As will be understood from the foregoing description, even if the thermal stress is exerted on the optical element, the thermal stress is absorbed in the buffer area, and does not cause the scratches to be grown to serious cracks. The optical element is not seriously deformed so that the optical device exhibits optical characteristics fallen within the design range. Thus, the optical devices are enhanced in production yield by virtue of the joint structure between the optical element and the holder.

Fabrication Process

The optical device is fabricated as follows. First, an optical element, a holder and a piece of solder are prepared. The optical element may be implemented by an optical body, only, or has the optical body partially covered with a metallization layer. The metallization layer makes the optical element affinitive to the solder. The holder may be plated with a metal or alloy layer, which also makes the holder affinitive to the solder.

The manufacturer determines a joint area spaced from the periphery of the major surface of the optical element and another joint area on a surface of the holder, and aligns the joint area with the another joint area. The joint area on the major surface is spaced from the periphery of the major surface by a predetermined distance, and the area between the periphery and the joint area serves as the buffer area. In standard optical devices, the minimum value of the predetermined distance is of the order of 20 micrometers.

Finally, the piece of solder is inserted between the joint area on the major surface and the another joint area, and is melted so that the optical element is bonded to the holder. The buffer area is spaced from the holder, and the thermal stress is absorbed by virtue of the buffer area.

When a piece of solder or glass is melted with heat, part of the solder/glass may flow out from the joint area into the buffer area. Even if the part of solder/glass reaches the end surface or the cutting plane, the scratches are never grown into cracks, because the thermal stress is exerted only on the joint area.

First Embodiment

Figure 2:
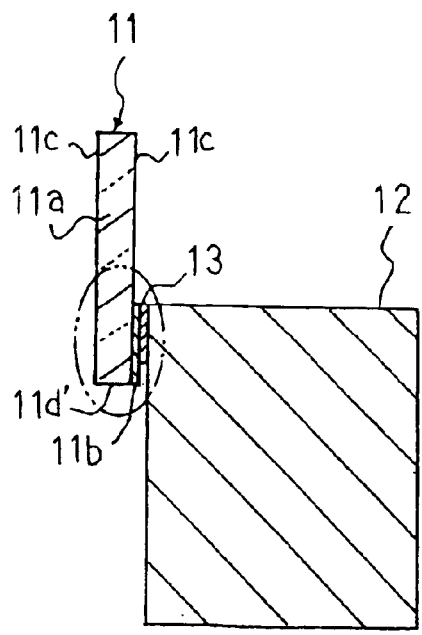
FIG. 2 is a cross sectional view showing an optical element and a holder assembled into the optical device.
Figure 3:
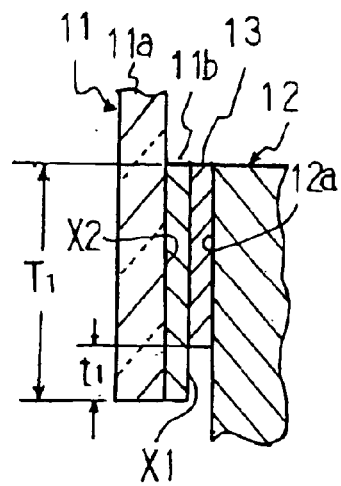
FIG. 3 is a cross sectional view showing the joint portion between the optical element and the holder encircled in an ellipse of FIG. 2.

Referring to FIGS. 1 to 3 of the drawings, an optical device embodying the present invention comprises an optical filter 11, a metallic holder 12 and a solder layer 13. The optical filter 11 and metallic holder 12 and solder layer 13 are corresponding to the optical element and holder, respectively. The optical filter 11 is bonded to the metallic holder 12 by means of the solder layer 13, and a gap takes place between the optical element 11 and the metallic holder 12 as will be described hereinafter in detail.

The optical element 11 includes an optical body 1 Ia and a metallization layer 11b. The optical body 1 Ia is made of the optical crystal such as alumina or rutile, and has a plate like contour. The plate-like optical body. 11a has a pair of major surfaces 11c, and the major surfaces 11c are rectangle. End surfaces 1 Id extending between the peripheries of the major surfaces 11c. Light is incident on one of the major surfaces 11c, and is output from the other major surface. At least one end surface 1 Id' is a cutting plane. When the plate-like optical body 11a was cut out from a bulk, a cutting tool slid on the end surface 1 Id'. For this reason, scratches are found on the end surface 11d'.

The metallization layer 11b has a multiple-layered structure. A titanium layer, a nickel layer and a gold layer form in combination the metallization layer 11b. In this instance, the titanium layer, nickel layer and gold layer are 0.01 micrometer thick, 0.2 micrometer thick and 0.5 micrometer thick, respectively. The titanium layer is strongly bonded to the optical crystal, and the gold layer is affinitive to the solder layer 13. The metallization layer 11b occupies an area on the major surface 11c which extends along the edge line between the end surface 11d' and the major surface 1 ic. The area and, accordingly, the metallization layer 11b has the width of T, micrometers, and is as long as the edge line between the end surface 1 Id' and the major surface 11c. The joint area X2 and buffer area X 1 are defined in the exposed surface of the metallization layer 1 Ib. The buffer area X1 has the width t1, and is as long as the edge line. The remaining area on the surface of the metallization layer 11b serves as the joint area X2. Thus, the joint area X2 is spaced from the edge line, which is part of the periphery, by t,. The distance t, is equal to or greater than 20 micrometers.

The metallic holder 12 is made of the alloy, which has the thermal expansion coefficient approximated to that of the optical crystal. The metallic holder 12 is plated with a nickel layer of 5.0 micrometers thick and a gold layer of 1.0 micrometer thick. On a side surface of the metallic holder 12 is defined a joint area 12a which is as narrow as and as long as the joint area X2.

The optical element 11 is bonded to the metallic holder 12 by mean of the solder layer 13. In this instance, the solder is selected from the Au—Sn alloy series so that solder is affinitive to both of the metallization layer 11b and the metallic holder 12. The joint area X2 and joint area 12a are bonded to one another by means of the solder layer 13, and the optical element 11 and metallic holder 12 are assembled into the optical device. The buffer area X1 is not bonded to the metallic holder 12. Even if thermal stress is exerted on the optical device, the buffer zone X1 absorbs the thermal stress, and the scratches are not grown to cracks. The optical body 11a is not widely deformed so that the optical device exhibits the design optical characteristics. This results in enhancement of production yield.

Description is herein below made on a process for fabricating the optical device implementing the first embodiment. First, the optical element 11, metallic holder 12 and a piece of solder 13 are prepared. In this instance, a solder foil is used as the piece of solder 13, and has the width equal to (T,-t,) micrometers. The optical element 11 and metallic holder 12 are respectively prepared as follows.

A metal mask (not shown) is placed on the major surface 11c. Otherwise, a photo-resist mask (not shown) may be formed on the major surface 11c through a photolithography. The major surface 11c is covered with the mask except the area corresponding to the joint! buffer areas X1/X2. The width of the uncovered area is T, micrometers. The optical body 11a partially covered with the photo-mask is placed in a chamber of a sputtering system. Titanium is deposited to 0.01 micrometer thick over the entire surface through the sputtering phenomenon. Upon completion of the titanium layer, nickel is deposited to 0.2 micrometer thick over the titanium layer, and gold is finally deposited over the nickel layer to 0.5 micrometer thick. The gold may be deposited by using an evaporation technique. The mask is lifted off. Then, the titanium layer, nickel layer and gold layer are left on the area corresponding to the joint/buffer areas X1/X2. Although the joint/buffer areas X1/X2 are metallized with the titanium, nickel and gold, any sort or sorts of metal/alloy are available for the optical element i 1 in so far as the metal/ alloy enhances the bonding property of the optical element 11 without any adverse influence on the optical characteristics. The thickness of the metallization layer and deposition technique are changeable depending upon the crystal body 11a.

On the other hand, a piece of the alloy is firstly shaped into the metallic holder 12, and is dipped into an electroplating bath. The metallic holder 12 is electroplated with a nickel layer of 5.0 micrometers thick. Subsequently, gold is electroplated to 1.0 micrometer thick on the nickel layer. The outermost layer, i.e., the gold layer, is affinitive to the solder of Au—Sn alloy series. Although the nickel and gold are electroplated on the metallic holder 12, any sort or sorts of metal/alloy are available for the metallic holder 12 in so far as the metal/alloy enhances the bonding strength and/or the anti-corrosion property.

Subsequently, the optical element 11 and metallic holder 12 are placed on a jig (not shown). When the optical element 11 and metallic holder 12 are appropriately positioned in the jig, the joint area X2 is aligned with the joint area 12a. The solder foil 13 is placed on the joint area X2 or 12a, and the side edge of the solder foil 13 is spaced from the edge line between the end surface 1 1d' and the major surface 11c by t1 micrometer. The optical element 11 is moved onto the metallic holder 12 so that the solder foil 13 is sandwiched between the optical element 11 and the metallic holder 12. The joint area X2 is opposed to the joint area 12a through the solder foil 13.

The jig is placed on a conveyer, and travels through nitrogen atmosphere containing 40% of hydrogen and created in a reflow furnace together with the optical element/metallic holder/solder foil. The jig and the optical element/metallic holder/solder foil 11/12/13 are heated to 300 degrees in centigrade in the reflow furnace. The conveyer is moved at 100 millimeters per minute, and the jig/optical element/metallic holder/solder foil are maintained in the high-temperature nitrogen atmosphere for 10 minutes. While the jig is traveling through the high-temperature nitrogen atmosphere, the solder foil is re-flowed. The jig/optical element/metallic holder/solder are cooled, and the solder is solidified, again. Thus, the joint area X2 is bonded to the joint area 12a by means of the solder layer, and the optical element 11 and the metallic holder 12 are assembled into the optical device.

The buffer area X1 is spaced from the metallic holder 12. Even if the thermal stress is exerted on the optical element 11 due to the difference in thermal expansion coefficient between the optical element 11 and the metallic holder 12, the buffer area X1 absorbs the thermal stress, and the thermal stress is less influential in growing the scratches to cracks. From this viewpoint, it is preferable to regulate the solder foil to a proper quantity. If the solder is too much, the solder is spread over the buffer area X1. Even so, the overflowing solder does not contribute to the bond between the optical element 11 and the metallic holder 12. In other words, the overflowing solder does not exert any stress on the optical element 11. For this reason, the buffer area X1 can absorb the thermalstress.

As will be understood, the optical device is surely fabricated through the process. The buffer area X1 is surely defined under the part of the metallization layer 11b. The buffer area X1 is effective against the thermal stress, and the process embodying the present invention is conducive to the enhancement of the production yield.

Second Embodiment

Figure 4:
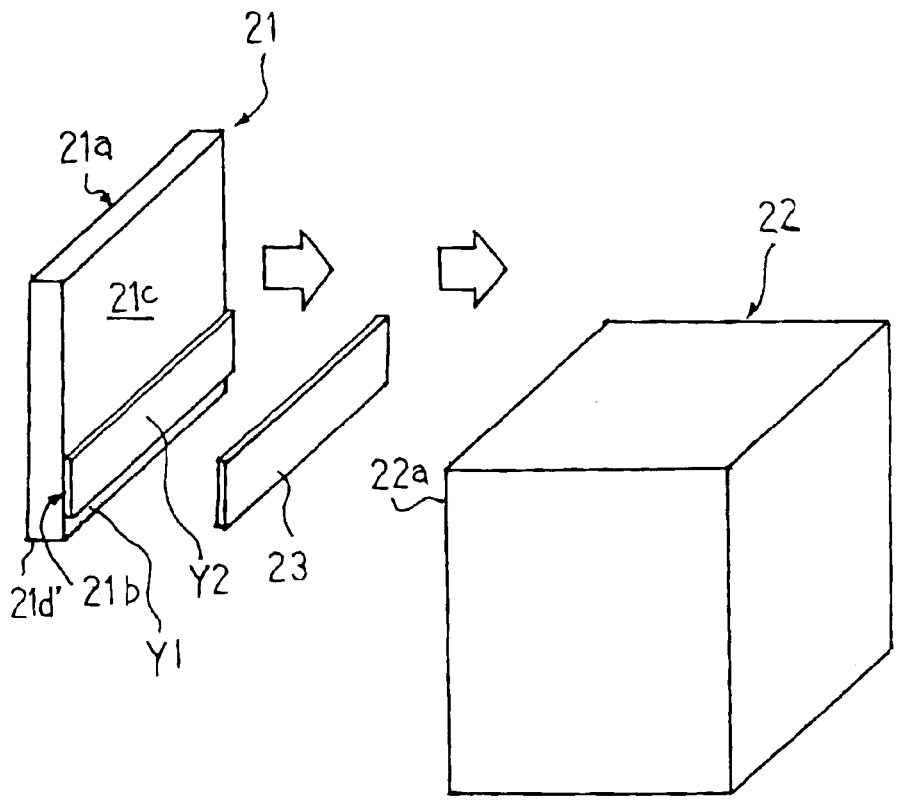
FIG. 4 is a schematic perspective view showing another optical device disassembled into parts.
Figure 5:
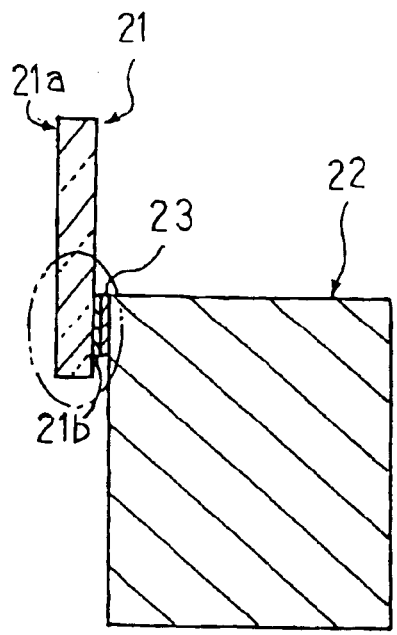
FIG. 5 is a cross sectional view showing an optical element and a holder assembled into the optical device.
Figure 6:
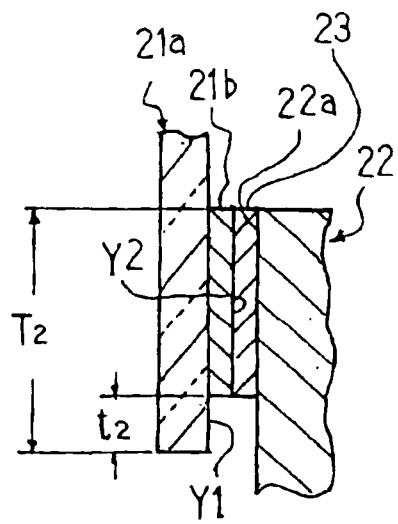
FIG. 6 is a cross sectional view showing the joint portion between the optical element and the holder encircled in an ellipse of FIG. 5.

Turning to FIGS. 4, 5 and 6 of the drawings, another optical device embodying the present invention largely comprises an optical element 21, a metallic holder 22 and a piece of solder 23. The metallic holder 22 and the piece of solder 23, i.e., a solder foil are similar to those 12 and 13 of the first embodiment. For this reason, no further description is herein below incorporated for the sake of simplicity.

The optical element 21 includes an optical body 21a and a metallization layer 21b. The optical body 21a is same as the optical body 11a, and serves as an optical filter. However, the metallization layer 21b is narrower than the metallization layer 11b. A buffer area Y1 is uncovered with the metallization layer 21b, and is exposed to the gap between the optical body 21a and the metallic holder 22. The buffer area Y1 is t2 micrometers wide, and the metallization layer 21b has the width $(T_2-t_2)$ micrometers. The distance $t_2$ is equal to or greater than 20 micrometers.

The buffer area Y1 is effective against the thermal stress, and the optical device implementing the second embodiment is produced at a high yield as similar to the optical device of the first embodiment.

The optical device implementing the second embodiment is fabricated as follows. First, the optical element 21, metallic holder 22 and a solder foil 23 are prepared. In this instance, the solder foil 23 has the width equal to $(T_2-t_2)$ micrometers. The optical element 21 and metallic holder 22 are respectively prepared as follows.

A metal mask (not shown) is placed on the major surface 11c. Otherwise, a photo-resist mask (not show) may be formed on the major surface through a photo-lithography. A major surface 21c of the optical body 21a is covered with the mask except the area corresponding to the joint area Y2. The optical body 21a partially covered with the photo-mask is placed in a chamber of a sputtering system. Titanium is deposited to 0.01 micrometer thick over the entire surface through the sputtering phenomenon. Upon completion of the titanium layer, nickel is deposited to 0.2 micrometer thick over the titanium layer, and gold is finally deposited over the nickel layer to 0.5 micrometer thick. The mask is lifted off. Then, the titanium layer, nickel layer and gold layer are left on the area corresponding to the joint area Y2. Although the joint area Y2 is metallized with the titanium, nickel and gold, any sort or sorts of metal/alloy are available for the optical element 21 in so far as the metal/alloy enhances the bonding property of the optical element 21 without any adverse influence on the optical characteristics. The thickness of the metallization layer and deposition technique are changeable depending upon the crystal body 21a.

On the other hand, a piece of the alloy is firstly shaped into the metallic holder 22, and is dipped into an electroplating bath. The metallic holder 22 is electroplated with a nickel layer of 5.0 micrometers thick. Subsequently, gold is electroplated to 1.0 micrometer thick on the nickel layer. The outermost layer, i.e., the gold layer, is affinitive to the solder of Au—Sn alloy series. Although the nickel and gold are electroplated on the metallic holder 22, any sort or sorts of metal/alloy are available for the metallic holder 22 in so far as the metal alloy enhances the bonding strength and/or the anti-corrosion property.

Subsequently, the optical element 21 and metallic holder 22 are placed on a jig (not shown). When the optical element 21 and metallic holder 22 are appropriately positioned in the jig, the joint area Y2 is aligned with a joint area 22a. The solder foil 23 is placed on the joint area Y2 or 22a, and the side edge of the solder foil 23 is spaced from the edge line between the end surface 21d' and the major surface 21c by $t_2$ micrometer. The optical element 21 is moved onto the metallic holder 22 so that the solder foil 23 is sandwiched between the optical element 21 and the metallic holder 22. The joint area Y2 is opposed to the joint area 22a through the solder foil 23.

The jig is placed on a conveyer, and travels through nitrogen atmosphere containing 40% of hydrogen and created in a reflow furnace together with the optical element/metallic holder/solder foil. The jig and the optical element/metallic holder/ solder foil 21/22/23 are heated to 300 degrees in centigrade in the reflow furnace. The conveyer is moved at 100 millimeters per minute, and the jig/optical element/metallic holder/solder foil are maintained in the high-temperature nitrogen atmosphere for 10 minutes. While the jig is traveling through the high-temperature nitrogen atmosphere, the solder foil is reflowed. The jig/optical element/metallic holder/solder are cooled, and the solder is solidified, again. Thus, the joint area Y2 is bonded to the joint area 22a by means of the solder layer, and the optical element 21 and the metallic holder 22 are assembled into the optical device.

The buffer area Y1 is spaced from the metallic holder 22. Even if the thermal stress is exerted on the optical element 21 due to the difference in thermal expansion coefficient between the optical element 21 and the metallic holder 22, the buffer area Y1 absorbs the thermal stress, and the thermal stress is less influential in growing the scratches to cracks. From this viewpoint, it is preferable to regulate the solder foil to a proper quantity. If the solder is too much, the solder is spread over the buffer area Y1. Even so, the overflowing solder does not contribute to the bond between the optical element 21 and the metallic holder 22. In other words, the overflowing solder does not exert any stress on the optical element 21. For this reason, the buffer area Y1 can absorb the thermal stress.

As will be understood, the optical device shown in FIGS. 4 to 6 is surely fabricated through the process. The buffer area Y1 is defined on the major surface 11c of the optical element 11. The buffer area Y1 is effective against the thermal stress, and the process embodying the present invention is conducive to the enhancement of the production yield.

Third Embodiment

Figure 7:
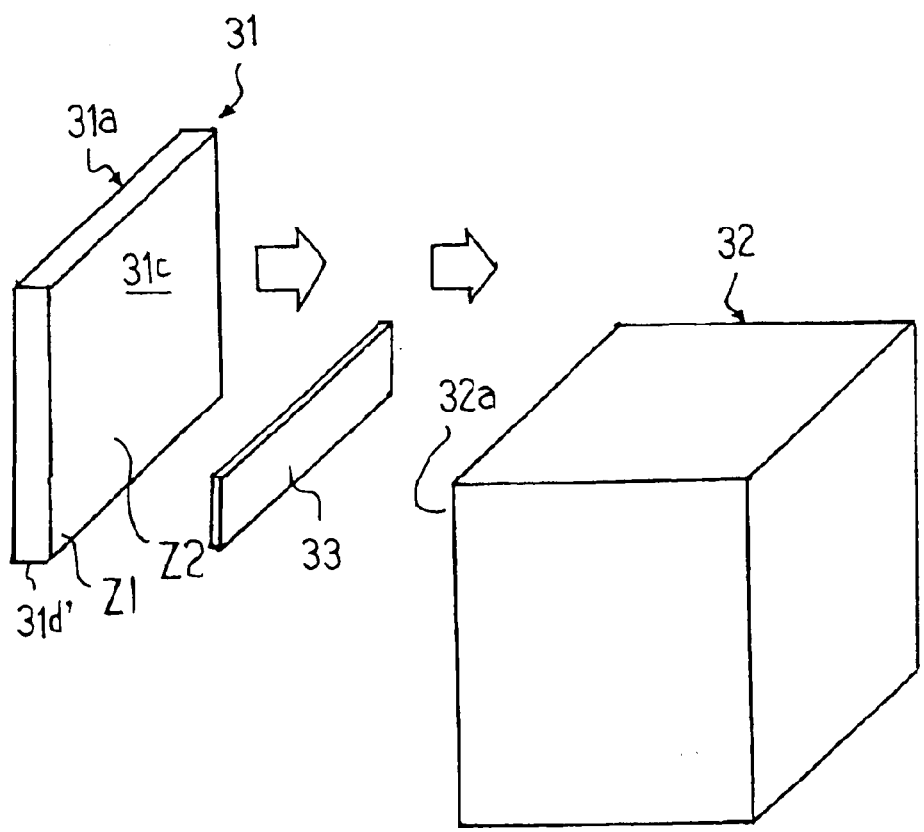
FIG. 7 is a schematic perspective view showing yet another optical device disassembled into parts.
Figure 8:
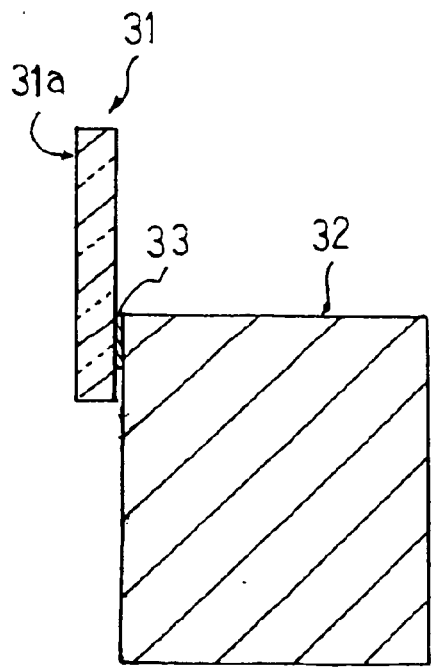
FIG. 8 is a cross sectional view showing an optical element and a holder assembled into the optical device.
Figure 9:
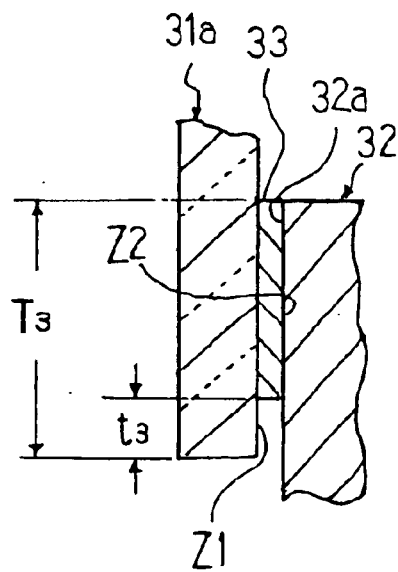
FIG. 9 is a cross sectional view showing the joint portion between the optical element and the holder encircled in an ellipse of FIG. 8.

Turning to FIGS. 7, 8 and 9 of the drawings, yet another optical device embodying the present invention largely comprises an optical element 31, a metallic holder 32 and a piece of low melting point glass 33. The optical element 31 is implemented by only an optical body 31a, and any metallization layer is not placed on a major surface 31c of the optical body 31a. The other features of the optical element 31 are same as those of the optical element 11. The metallic holder 32 is similar to the metallic holders 12/22 except that the metallic holder 32 is not plated with any metal/alloy. Nevertheless, in case where the optical device is exposed to corrosive environment, the metallic holder 32 may be plated with a nickel layer. The other features of the metallic holder 32 are same as those of the metallic holders 12/22.

A buffer area Z1 and a joint area Z2 are defined in the major surface 31c of the optical body 31. The buffer area Z1 is $t_3$ micrometers wide, and the joint area Z2 has the width $(T_3-t_3)$ micrometers. The distance $t_3$ is equal to or greater than 20 micrometers. The buffer area Z1 is effective against the thermal stress, and the optical device implementing the third embodiment is produced at a high yield as similar to the optical device of the first and second embodiments.

The low melting point glass 33 is in the lead oxide, i.e., PbO series, and the melting point is 450 degrees in centigrade. Since the glass is well bonded to both of the optical crystal and the alloy, neither metallization layer nor plating layer is required for the optical element 31 and the metallic holder 32.

The optical device implementing the third embodiment is fabricated as follows. First, the optical element 31, metallic holder 32 and a piece of glass foil 33 are prepared. In this instance, the solder foil 23 has the width equal to $(T_3-t_3)$ micrometers.

Subsequently, the optical element 31 and metallic holder 32 are placed on a jig (not shown). When the optical element 31 and metallic holder 32 are appropriately positioned in the jig, the joint area Z2 is aligned with a joint area 32a of the metallic holder 32. The glass foil 33 is placed on the joint area Z2 or 32a, and the side edge of the glass foil 33 is spaced from the edge line between the end surface 31d' and the major surface 31c by $t_3$ micrometers. The optical element 31 is moved onto the metallic holder 32 so that the glass foil 33 is sandwiched between the optical element 31 and the metallic holder 32. The joint area Z2 is opposed to the joint area 32a through the solder foil 33.

The jig is placed on a conveyer, and travels through pure nitrogen atmosphere created in a reflow furnace together with the optical element/metallic holder/glass foil. The jig and the optical element/metallic holder/glass foil 31/32/33 are heated to 480 degrees in centigrade in the reflow furnace. The conveyer is moved at 100 millimeters per minute, and the jig/optical element/metallic holder/glass foil are maintained in the high-temperature pure nitrogen atmosphere for 10 minutes. While the jig is traveling through the high-temperature pure nitrogen atmosphere, the glass foil is reflowed. The jig/optical element/metallic holder/glass are cooled, and the glass is solidified, again. Thus, the joint area Z2 is bonded to the joint area 32a by means of the glass layer, and the optical element 31 and the metallic holder 32 are assembled into the optical device.

The buffer area Z1 is spaced from the metallic holder 32. Even if the thermal stress is exerted on the optical element 31 due to the difference in thermal expansion coefficient between the optical element 31 and the metallic holder 32, the buffer area Z1 absorbs the thermal stress, and the thermal stress is less influential in growing the scratches to cracks. From this viewpoint, it is preferable to regulate the glass foil to a proper quantity. If the glass is too much, the glass is spread over the buffer area Z1. Even so, the overflowing glass does not contribute to the bond between the optical element 31 and the metallic holder 32. In other words, the overflowing glass does not exert any stress on the optical element 31. For this reason, the buffer area Z1 can absorb the thermal stress.

As will be understood, the optical device shown in FIGS. 7 to 9 is surely fabricated through the process. The buffer area Z1 is defined on the major surface 31c of the optical element 31. The buffer area Z1 is effective against the thermal stress, and the process embodying the present invention is conducive to the enhancement of the production yield.

Experiments

The inventors fabricated five groups of samples through the process implementing the first embodiment. The five groups were different in the width $t_1$ of the buffer area X1. The first group a1 consisted of a hundred samples, and $t_1$ was 10 micrometers. The second group a2 consisted of a hundred samples, and $t_1$ was 20 micrometers. The third group a3 consisted of a hundred samples, and $t_1$ was 30 micrometers. The fourth group a4 consisted of a hundred samples, and $t_1$ was 50 micrometers. The fifth group a5 consisted of a hundred samples, and $t_1$ was 0 micrometers, i.e., the solder reaches the edge line between the end surfaces 11d' and the major surfaces 11c.

The inventors further fabricated five groups of samples through the process implementing the second embodiment. The five groups were different in the width $t_2$ of the buffer area Y1. The first group b1 consisted of a hundred samples, and $t_2$ was 10 micrometers. The second group b2 consisted of a hundred samples, and $t_2$ was 20 micrometers. The third group b3 consisted of a hundred samples, and $t_2$ was 30 micrometers. The fourth group b4 consisted of a hundred samples, and $t_2$ was 50 micrometers. The fifth group b5 consisted of a hundred samples, and $t_2$ was 0 micrometers, i.e., the solder reaches the edge line between the end surfaces 21d' and the major surfaces 21c.

The inventors further fabricated five groups of samples through the process implementing the third embodiment. The five groups were different in the width $t_3$ of the buffer area Z1. The first group c1 consisted of a hundred samples, and $t_3$ was 10 micrometers. The second group c2 consisted of a hundred samples, and $t_3$ was 20 micrometers. The third group c3 consisted of a hundred samples, and $t_3$ was 30 micrometers. The fourth group c4 consisted of a hundred samples, and $t_3$ was 50 micrometers. The fifth group c5 consisted of a hundred samples, and $t_3$ was 0 micrometers, i.e., the solder reaches the edge line between the end surfaces 31d' and the major surfaces 31c.

Thus, the inventors prepared fifteen groups a1, a2, a3, a4, a5, b1, b2, b3, b4, b5, c1, c2, c3, c4 and c5. Using those sample groups a1 to c5, the inventors exerted thermal stress on the samples. In detail, the inventors cooled the samples a1 to c5 to −40 degrees in centigrade, and maintained the samples in the low-temperature ambience for 30 minutes. Subsequently, the inventors heated the samples a1 to c5 to +85 degrees in centigrade, and maintained the samples in the high-temperature ambience for 30 minutes. The inventors repeated the heat cycle between −40 degrees in centigrade and +85 degrees in centigrade, and observed the samples a1 to c5 to see whether or not cracks occurred. The inventors counted the cracked samples, and calculated the ratio of the cracked sample as shown in the following table.

TABLE

| Sample Group | Distance (micrometers) | Ratio of Cracked Samples (%) |
|---|---|---|
| a1 | $t_1 = 10$ | 50 |
| a2 | $t_1 = 20$ | 5 |
| a3 | $t_1 = 30$ | 0 |
| a4 | $t_1 = 50$ | 0 |
| a5 | $t_1 = 0$ | 92 |
| B1 | $t_2 = 10$ | 62 |
| b2 | $t2 = 20$ | 7 |
| b3 | $t2 = 30$ | 0 |
| b4 | $t_2 = 50$ | 0 |
| b5 | $t_2 = 0$ | 95 |
| c1 | $t_3 = 10$ | 71 |
| c2 | $t3 = 20$ | 3 |
| c3 | $t3 = 30$ | 0 |
| c4 | $t3 = 50$ | 0 |
| c5 | $t_3 = 0$ | 98 |

The samples were cracked in the sample groups a5, b5 and c5 at high ratio, i.e., 92%, 95% and 98%. The samples were also cracked in the sample groups a1, b1 and c1 at high ratio, i.e., 50%, 62% and 71%. However, the cracked samples was zero or a few in the sample groups a2 to a4, b2 to b4 and c2 to c4. The joint areas X2/Y2/Z2 of the metallic holders 12/22/32 reached the edge lines between the end surfaces 11d'/21d'/31d' and the major surfaces 11c/21c/31c of the optical elements 11/21/31 in the sample groups a5, b5 and c5. This meant that those samples did not have any buffer area, and the thermal stress was directly exerted on the end surfaces 11d'/21d'/31d' during the repetition of the heat cycles. This resulted in the cracked samples. On the other hand, the optical elements 11/21/31 of the samples groups a1 to a4, b1 to b4 and c1 to c4 had the joint areas X2/Y2/Z2 set back from the edge lines, and the buffer areas XI/Y1/Zi extended between the edge lines and the joint areas X2/Y2/Z2. The cracked samples were reduced at 45%, 33% and 17% (compare the sample groups a1, b1 and c1 with the sample groups a5, b5 and c5)–100% (compare the sample groups a3/a4, b3/b4 and c3/c4 with the sample groups a5, b5 and c5). It was beyond doubt that the buffer area was effective against the thermal stress. The buffer areas X1/Y1/Z1 absorbed the thermal stress, and did not permit the thermal stress to be seriously exerted on the end surfaces 11d', 21d' and 31d'.

Nevertheless, the samples of the group a1, b1 and c1 were cracked much more than the samples of the groups a2–a4, b2–b4 and c2–c4 were. When examining the sample groups a1–a4, b1–b4 and c1–c4 thoroughly, the cracked samples were decreased together with widening the buffer areas X1/Y1/Z1. The buffer areas X1/Y1/Zi in the sample groups a1, b1 and c1 were not so wide that the thermal stress could influenced the scratches on the end surfaces 11d'/21d'/31d'. The cracked samples were drastically reduced between the sample groups a1/b1/c1 and the sample groups a2/b2/c2. The present inventors concluded that the boundary was 20 micrometers. Thus, when the optical devices of the type described hereinbefore had the buffer area as wide as or wider than 20 micrometers, the optical devices were almost free from the thermal stress due to the difference in thermal expansion coefficient between the optical elements and the metallic holders. However, if optical devices had a structure different from that of the first to third embodiments, the buffer area narrower than 20 micrometers would rescue the optical devices from the damages.

As will be appreciated from the foregoing description, the buffer area is effective against the thermal stress, and the optical device according to the present invention is increased in production yield. The structure of the optical device is realized through the process according to the present invention.

Although particular embodiments of the present invention have been shown and described, it will be apparent to those skilled in the art that various changes and modifications may be made without departing from the spirit and scope of the present invention.

For example, the optical element may be an optical fiber connector, an optical isolator, an optical circulator or an optical coupler. The optical element may be made of amorphous optical material such as, for example, amorphous glass.

The joint area may be spaced from the upper edge line of the optical elements. In this instance, there is a buffer area between the upper edge line and joint area. The joint area is bonded to a lower end portion of a metallic holder so as to project from the lower end of the metallic holder. Similarly, the optical element may project from the right side or left side of a metallic holder. In this instance, the buffer area is defined from the left side line or the right side line of the optical element.

An optical element may have a disc shaped optical body. In this instance, the buffer area inwardly extends from a part of the circular periphery by a certain distance, and the joint area is contiguous to the buffer area.

An optical element may have a concave or convex surface in a rectangular parallelepiped body, plate-like body or a disc-shaped body. Another optical element may have a cylindrical body, a conical body, a frustum body, a prism body, a pyramid body or a spherical body.

What is claimed is:

1. A process for fabricating an optical device, comprising the steps of:
   a) preparing an optical element having major surfaces and at least one end surface extending between peripheries of said major surfaces, a holder having a surface and a piece of fusible material;
   b) determining a joint area spaced from the periphery of at least one of said major surfaces and another joint area on said surface of said holder;

c) aligning said joint area with said another joint area; and d) bonding said joint area to said another joint area by means of said piece of fusible material such that a buffer area between said periphery and said joint area is spaced from said holder by a gap, wherein said buffer area has a width equal to or greater than 20 micrometers.

2. The process as set forth in claim 1, in which said optical element and said holder are put on a jig so that said jig makes said joint area and said another joint area aligned to one another in said step c).

3. The process as set forth in claim 1, in which said optical element has a metallization layer on said at least one of said major surfaces for offering said joint area.

4. The process asset forth in claim 3, in which said step a) includes the sub-steps of a-1) preparing a piece of optical crystal having a certain contour, a-2) forming a mask on said at least one of said major surfaces in such a manner that an area corresponding to at least said joint area is exposed to an opening formed in said mask, a-3) forming said metallization layer on said area, anda-4) removing said mask so that said metallization layer is left on said area.

5. The process as set forth in claim 4, in which another area corresponding to said buffer area is further exposed to said opening so that said metallization layer offers both of said joint area and said buffer area.

6. The process as set forth in claim 1, in which said optical element and said holder have a metallization layer on said at least one of said major surfaces and a covering layer on a piece of alloy shaped into said holder so that said joint areas are defined in a surface portion of said metallization layer and a surface portion of said covering layer, respectively.

7. The process as set forth in claim 6, in which said optical element is prepared through the sub-steps of a-1) preparing a piece of optical crystal having a certain contour, a-2) forming a mask on said at least one major surfaces in such a manner that an area corresponding to at least said joint area is exposed to an opening formed in said mask, a-3) forming said metallization layer on said area, and a-4) removing said mask so that said metallization layer is left on said area, and said holder is prepared independently from said sub-steps a-1) to a-4) through the sub-steps of a-5) preparing a piece of alloy having another contour, and a-6) covering said piece of alloy with a layer through an electroplating.

8. The process as set forth in claim 7, in which said metallization layer and said layer have respective multilayered structures, and the upper most layer of said metallization layer, said fusible material and the uppermost layer of said layer are made of Au, Au—Sn alloy and Au, respectively.

* * * * *